United States Patent
Olgaard et al.

(10) Patent No.: US 7,772,922 B1
(45) Date of Patent: Aug. 10, 2010

(54) METHOD AND SYSTEM FOR TESTING DATA SIGNAL AMPLIFIER HAVING OUTPUT SIGNAL POWER DEPENDENT UPON MULTIPLE POWER CONTROL PARAMETERS

(75) Inventors: Christian Volf Olgaard, Saratoga, CA (US); Wassim El-Hassan, Cupertino, CA (US); Carsten Andersen, Livermore, CA (US)

(73) Assignee: LitePoint Corporation, Sunnyvale, CA (US)

( * ) Notice: Subject to any disclaimer, the term of this patent is extended or adjusted under 35 U.S.C. 154(b) by 0 days.

(21) Appl. No.: 12/425,058

(22) Filed: Apr. 16, 2009

(51) Int. Cl.
G01R 19/00 (2006.01)

(52) U.S. Cl. .......................................... 330/2; 330/296
(58) Field of Classification Search .................... 330/2, 330/285, 296
See application file for complete search history.

(56) References Cited

U.S. PATENT DOCUMENTS

| | | | | |
|---|---|---|---|---|
| 5,603,113 | A * | 2/1997 | De Loe, Jr. | 455/234.1 |
| 7,265,629 | B2 * | 9/2007 | Manku | 330/289 |
| 7,292,102 | B2 * | 11/2007 | Lee et al. | 330/254 |
| 7,426,377 | B2 * | 9/2008 | Tanaka et al. | 455/255 |

* cited by examiner

*Primary Examiner*—Henry K Choe
(74) *Attorney, Agent, or Firm*—Vedder Price, P.C.

(57) ABSTRACT

A method and apparatus for testing a data signal amplifier having an output signal power dependent upon multiple signal power control parameters, e.g., signal gain control and amplifier bias current control.

14 Claims, 4 Drawing Sheets

TARGET dBm (EXAMPLE)

| VGC REGISTER VALUES | -50 | -40 | -30 | -20 | 0 | 5 | 10 | 15 |
|---|---|---|---|---|---|---|---|---|
| | | | | | | | | Center −i*Δ |
| | | | | | | | | ... |
| | | | | | | | Center −i*Δ | Center−3Δ |
| | | | | | | Center −i*Δ | Center−3Δ | Center−2Δ |
| | | | | Center −i*Δ | | Center−3Δ | Center−2Δ | Center−Δ |
| | | | | ... | Center −i*Δ | Center−2Δ | Center−Δ | Center (15) |
| | | | | Center−3Δ | ... | Center−Δ | Center (10) | Center+Δ |
| | | | Center −i*Δ | Center−2Δ | Center−3Δ | Center (5) | Center+Δ | Center+2Δ |
| | | | ... | Center−Δ | Center−2Δ | Center+Δ | Center+2Δ | Center+3Δ |
| | | | Center−3Δ | Center (0) | Center−Δ | Center+2Δ | Center+3Δ | ... |
| | | | Center−2Δ | Center+Δ | Center (5) | Center+3Δ | ... | Center+jΔ |
| | | | Center−Δ | Center+2Δ | Center+Δ | ... | Center+j*Δ | |
| | | | Center (−20) | Center+3Δ | Center+2Δ | Center+j*Δ | | |
| | | Center −1*Δ | | | Center+3Δ | | | |
| | | ... | | | ... | | | |
| | | Center−3Δ | | | Center+j*Δ | | | |

FIG. 4A

| FIG. 4A |
|---|
| FIG. 4B |

| VGC REGISTER VALUES | | | | | | | | |
|---|---|---|---|---|---|---|---|---|
| | Center−i*Δ | | | | | | | |
| | ... | | | | | | | |
| Center−i*Δ | Center−3Δ | | | | | | | |
| ... | Center−2Δ | Center−2Δ | | | | | | |
| Center−3Δ | Center−Δ | Center−Δ | | | | | | |
| Center−2Δ | Center (−40) | Center (−30) | | | | | | |
| Center−Δ | Center+Δ | Center+Δ | Center+Δ | | | | | |
| Center (−50) | Center+2Δ | Center+2Δ | Center+2Δ | | | | | |
| Center+Δ | Center+3Δ | Center+3Δ | | | | | | |
| Center+2Δ | ... | | ... | | | | | |
| Center+3Δ | Center+j*Δ | ... | | | | | | |
| ... | | Center+j*Δ | | | | | | |
| Center+j*Δ | | | Center+j*Δ | | | | | |
| 32 | 32 | 32 | 32 | 52 | 72 | 82 | 97 | 117 |
| PA BIAS REGISTER VALUES (EXAMPLE) | | | | | | | | |

FIG. 4B

METHOD AND SYSTEM FOR TESTING DATA SIGNAL AMPLIFIER HAVING OUTPUT SIGNAL POWER DEPENDENT UPON MULTIPLE POWER CONTROL PARAMETERS

BACKGROUND OF THE INVENTION

1. Field of the Invention

The present invention relates to methods and systems for testing data signal amplifiers, and in particular, to testing data signal amplifiers capable of multiple output signal power levels for minimizing power consumption.

2. Related Art

The current generation (3G) of cellular telephones offer, among other things, faster connection speeds to the internet. These higher connection speeds are achieved by more complex modulation and stricter requirements for accurate signal power levels. At the same time, since such devices are usually powered by batteries, these devices also need to minimize their power consumption.

Accordingly, to meet these conflicting requirements of high performance while consuming the lowest possible amount of power, these devices use many techniques to minimize power consumption, including minimizing current consumption in the radio frequency (RF) circuitry. Examples include dynamically changing bias current in the output power amplifier such that the bias current scales (e.g., higher or lower) in accordance with the transmitted signal power. Alternatively, or in some instances in addition, the power supply voltage to the output power amplifier can be controlled using a switching DC-DC converter to reduce the power supply voltage when transmitting at lower output signal power levels. While these techniques do help improve battery life, they also make device behavior more difficult to calibrate, since multiple power control parameters are changing as the output transmitted signal power changes. Accordingly, a more complex calibration technique is required.

Such calibration, which is done during performance testing of the device following its manufacture, has either been an iterative process or based on simple assumptions of the behavior of the device under test (DUT). The former technique will provide for more thorough testing and calibration, but at the cost of test speed, while the latter will often provide reasonable test results, but not optimal, since the test results, based on assumptions, may not be sufficiently accurate in view of the strict performance requirements.

Referring to FIG. 1, the output power amplifier 10 amplifies the outgoing data signal 11a to produce the amplified data signal 11b to be transmitted. The amplifier 10 receives its power 13b from a power source 12 controlled by a bias signal 13a. Accordingly, as discussed above, the power level of the transmitted signal 11b can be controlled, at least, by controlling the level of the input signal 11a to the power amplifier 10, as well as the DC power 13b provided to the amplifier 10 by the power source 12. As discussed above, this DC power 13b can be controlled by controlling its current or voltage in accordance with the bias control signal 13a.

Referring to FIG. 2, as discussed above, the RF output power (i.e., transmitted signal power delivered to the antenna) is a function of the power of the input signal 11a to the power amplifier 10 and the bias setting for the DC power 13b provided to the power amplifier 10 (FIG. 1). The two curves represent two different bias settings, with the lower curve resulting from a lower bias setting and the higher curve resulting from a higher bias setting. As can be seen, at lower power levels, output power verses input power is approximately linear. However, at higher levels, power variations differ significantly between the two bias settings.

A common test technique is to perform calibration in two or more steps. One step might be varying the power of the outgoing signal 11a provided to the amplifier 10, while maintaining fixed power supply voltage and bias current. A second step could be varying the power supply voltage while maintaining fixed input signal power and bias current. A third step can then be varying the bias current while maintaining fixed input signal power and power supply voltage. As a result, amplifier performance has been characterized with respect to two or three control parameters, from which expected performance can be inferred or extrapolated, based on the observed relationships between signal power, power supply voltage and bias current. However, such expected future performance is based on one test parameter with influences based on power supply voltage or bias current assumed to be consistent from one device to another.

While this may yield acceptable results for many devices, with increasingly strict performance requirements, it is unlikely that sufficiently low failure rates during actual operations can be achieved, since the characterized performance does not accurately model actual performance.

For example, maintaining constant bias current while varying the power of the amplifier input signal 11a, the operating temperature of the amplifier 10 may be higher than that to be expected during actual operation, since the bias setting will likely be higher than that used when battery power conservation measures are being followed. While it is possible to model the expected amplifier temperature, there will nonetheless be variations among devices. Further, since the power variances are applied quickly during testing, the internal temperature of the amplifier 10 may vary during these variances, while the system temperature measured at a different location within the device will not be affected significantly due to the fast testing. Accordingly, the testing operation will not accurately simulate normal operation.

SUMMARY OF THE INVENTION

In accordance with the presently claimed invention, a method and apparatus are provided for testing a data signal amplifier having an output signal power dependent upon multiple signal power control parameters, e.g., signal gain control and amplifier bias current control.

In accordance with one embodiment of the presently claimed invention, a method for testing a data signal amplifier having an output signal power dependent upon a plurality of signal power control parameters includes:

providing a first control signal corresponding to a first control parameter and having a first one of a first plurality of values;

providing a second control signal corresponding to a second control parameter and having a first sequential subset of a second plurality of values;

providing, to an amplifier, a power supply voltage and a bias current with at least one of which having a magnitude related to one of the first and second control signals;

providing, to the amplifier, an input data signal having a plurality of sequential magnitudes related to another of the first and second control signals;

providing, with the amplifier, an output data signal having a plurality of sequential magnitudes related to the one of the first and second control signals and the input data signal; and measuring each one of the plurality of sequential output data signal magnitudes, followed by providing the first control signal corresponding to the first control parameter and having a second one of the first plurality of values, providing the second control signal corresponding to the second control parameter and having a second sequential subset of the second plurality of values, and repeating the providing of the power supply voltage, the bias current, the input data signal and the output data signal, and the measuring of each one of the plurality of sequential output data signal magnitudes.

In accordance with another embodiment of the presently claimed invention, a system for testing a data signal amplifier having an output signal power dependent upon a plurality of signal power control parameters includes:

controller means for controlling as part of a first test sequence, conveyance of a first control signal corresponding to a first control parameter and having a first one of a first plurality of values, a second control signal corresponding to a second control parameter and having a first sequential subset of a second plurality of values, a power supply voltage and a bias current to an amplifier with at least one of which having a magnitude related to one of the first and second control signals, and an input data signal to the amplifier having a plurality of sequential magnitudes related to another of the first and second control signals, and as part of a second test sequence, conveyance of the first control signal corresponding to the first control parameter and having a second one of the first plurality of values, the second control signal corresponding to the second control parameter and having a second sequential subset of the second plurality of values, the power supply voltage and the bias current to the amplifier with said at least one of which having a magnitude related to the one of the first and second control signals, and the input data signal to the amplifier having a plurality of sequential magnitudes related to the another of the first and second control signals; and receiver means for as part of the first test sequence, receiving an output data signal from the amplifier and having a plurality of sequential magnitudes related to the one of the first and second control signals and the input data signal, and measuring each one of the plurality of sequential output data signal magnitudes, and as part of the second test sequence, receiving the output data signal from the amplifier and having a plurality of sequential magnitudes related to the first control signal and the input data signal, and measuring each one of the plurality of sequential output data signal magnitudes.

BRIEF DESCRIPTION OF THE DRAWINGS

FIG. 4 is a table of power control parameters and variations of such parameters to be applied during testing in accordance with one embodiment of the presently claimed invention.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
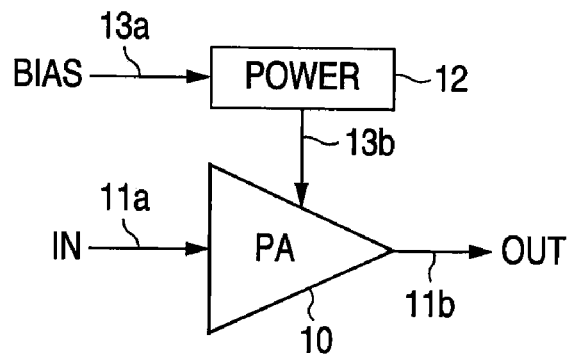
FIG. 1 is a functional block diagram of a conventional output power amplifier stage of a data signal transmitter, such as a cellular telephone.
Figure 2:
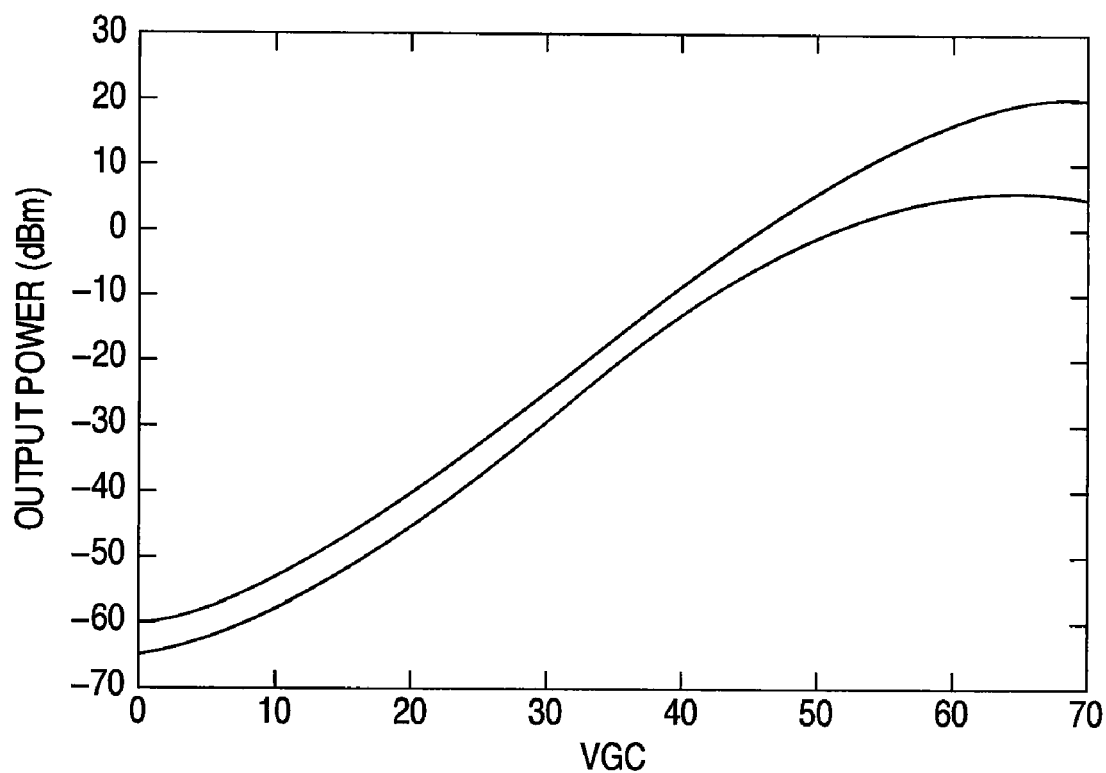
FIG. 2 is a graph of two output-verses-input power curves for the amplifier signals of FIG. 1.
Figure 3:
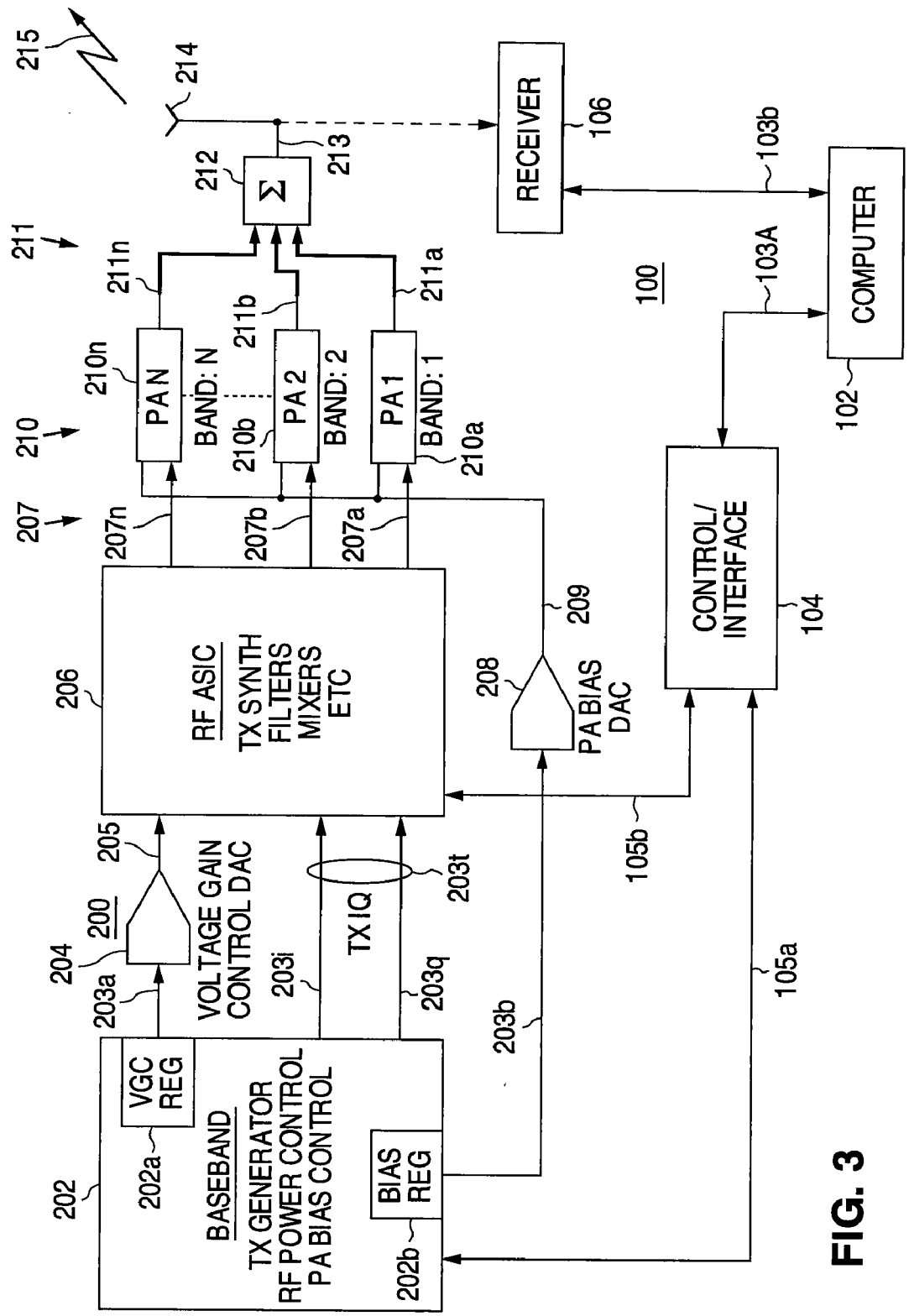
FIG. 3 is a functional block diagram of a test setup for testing in accordance with one embodiment of the presently claimed invention.

Referring to FIG. 3, in accordance with one embodiment of the presently claimed invention, a testing apparatus 100 is coupled as appropriate to a DUT 200. In this example, the testing apparatus 100 includes a computer 102, control/interface circuitry 104 and a RF receiver 106. The DUT 200 includes baseband circuitry 202, RF circuitry 206 (e.g., in the form of an application specific integrated circuit, or ASIC), output power amplifiers 210, signal combining or routing circuitry 212 (e.g., signal summing circuitry or a diplexer), and an antenna 214. Also included are digital-to-analog converters (DACs) 204, 208 providing signal conversion between the baseband circuitry 202 and the RF circuitry 206 and power amplifiers 210 (discussed in more detail below).

The baseband circuitry 202 includes a transmit signal generator to provide the transmit data signal 203$t$, e.g., in the form of quadrature signals 203$i$, 203$q$. Also included is RF power control circuitry to provide voltage gain control (VGC) data for the RF circuitry 206. The VGC data are stored in a register 202$a$, with selected data 203$a$ converted by the VGC DAC 204 to provide an analog control signal 205 for controlling the power levels of the transmit data signals provided as the input signals 207 to the power amplifiers 210. The baseband circuitry 202 also includes power amplifier bias control circuitry to provide bias control data. These bias control data are stored in a bias register 202$b$, with the selected bias control data 203$b$ converted by the bias DAC 208 to provide an analog bias control signal 209 for the power amplifiers 210.

The RF circuitry 206 typically includes frequency synthesis circuitry, filters and mixers for frequency up-conversion of the transmit data signal 203$t$, and amplifier circuitry controlled by the VGC signal 205 to provide the transmit data signals 207 to the power amplifiers 210.

The respective transmit data signals 207a, 207b, . . . , 207n are provided to corresponding respective power amplifiers 210a, 210b, . . . , 210n, with each signal 207 and amplifier 210 operating within a different predetermined frequency range. The resulting amplified signals 211 are conveyed to the antenna 214 for transmission 215 via the signal combiner or router 212 in accordance with well known principles.

The control/interface circuitry 104 communicates with the baseband circuitry 202 and RF circuitry 206 via one or more control or interface signals 105a, 105b, e.g., to control access to and selection of the stored VGC 202a and bias 202b control data during testing. The receiver 106 receives the transmit signal 213 during testing. The computer 102, via one or more control and data signals 103a communicates with and controls the control/interface circuitry 104. The computer 102, via one or more additional control and data signals 103b, controls the receiver 106 and accesses transmitter data as received via the output transmit signal 213. The receiver 106 also includes circuitry for measuring power levels of the transmit signal 213, with the resulting power level data being made available for analysis by the computer 102.

Referring to FIG. 4, in accordance with the presently claimed invention, the control/interface circuitry 104, via its control and interface signals 105a, 105b, causes a transmit data signal 203t to be generated, and frequency converted, filtered and amplified to be made available as the input signals 207 to the power amplifiers 210. The power level of each input signal 207a, 207b, . . . , 207n is established in accordance with the VGC control signal 205, while the bias for each power amplifier 210a, 210b, . . . , 210n (e.g., bias current or power supply voltage) is controlled by the bias control signal 209. In accordance with the presently claimed invention, selected subsets of the VGC and bias control data are used during testing. For example, assuming that the VGC control register 202a includes values within the range of 0-255 and the bias control register 202b includes values in the range of 0-127, the bias control may be defined such that a bias setting of 52 corresponds to a power level of −20 dBm, with the range from −20 dBm through 0 dBm being linearly interpolated such that bias control value of 72 corresponds to 0 dBm. Similarly, bias control data values of 82, 97 and 117 can be defined to correspond to power levels of 5, 10 and 15 dBm, respectively (with appropriate linear interpolations of the bias control data within such ranges).

As shown in the Figure, each column includes a "center" value, which is the VGC control register value corresponding to the target power (dBm) for that column, with each register control data value being variable up or down by one or more values of Δ (with Δ being configurable as desired in terms of DAC settings per dB), with lower "i" and higher "j" limits (also configurable as desired). These variables ("center", Δ, "i", "j") will have different values from one column to another.

In accordance with one embodiment of the presently claimed invention, the VGC control data 202a is accessed and selected in subsets, or sub-ranges, with each subset of VGC control data being used with one specific bias control level. For example, at a bias control setting of 32, the VGC control data can be swept through a range of values from 10 through 50 in steps of 10, followed by resetting the bias control data to a value of 52 and sweeping the VGC control data from 40 through 80 in steps of 10, followed by resetting the bias control data to 72 and sweeping the VGC control data from 70 through 120, followed by resetting the bias control data to 82 and sweeping the VGC control data from 100 through 170, followed by resetting the bias control data to 97 and sweeping the VGC control data from 140 through 200, followed by resetting the bias control data to 117 and sweeping the VGC control data from 160 through 240.

Based upon the results of such measurements, it will be possible to interpolate the correct point for a given bias level and matching power level. For example, it will be possible to identify the VGC control register 202a setting producing −40 dBm of power at a bias control setting of 32, the VGC control register 202a value producing a power of −20 dBm at a bias setting of 52, and so on. Further, as shown in FIG. 4, the VGC control ranges in adjoining target power columns are overlapping, thereby allowing for interpolation between measurements corresponding to the data in the adjoining columns. For example, a VGC control register value of 150 will have three different measured powers for three different bias settings (82, 97, 117), thereby enabling interpolation of how different bias settings affect the transmitted power. As a result, a two-dimensional mesh structure of test data can be created, thereby allowing calibration values to be extrapolated to provide a more accurate representation of DUT performance.

As will be readily understood by one of ordinary skill in the art, it may be necessary to insert "dummy" data packets into the outgoing data signals 207 to ensure that the power amplifiers 210 operate for a sufficiently long time interval to reach the correct operating temperature for each bias and VGC control data setting before measurements are performed. As will be readily appreciated, this can be achieved by sending multiple such "dummy" data packets at the particular bias and VGC control data setting before the sequence of test data is transmitted.

In accordance with the presently claimed invention, it is possible to extend this testing technique to provide two variable control parameters affecting the resulting signal transmit power. Preferably, the testing would be defined to have two parameters varying while a third parameter is maintained at a constant predetermined value.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing a data signal amplifier having an output signal power dependent upon a plurality of signal power control parameters, comprising:

providing a first control signal corresponding to a first control parameter and having a first one of a first plurality of values;

providing a second control signal corresponding to a second control parameter and having a first sequential subset of a second plurality of values;

providing, to an amplifier, a power supply voltage and a bias current with at least one of which having a magnitude related to one of said first and second control signals;

providing, to said amplifier, an input data signal having a plurality of sequential magnitudes related to another of said first and second control signals;

providing, with said amplifier, an output data signal having a plurality of sequential magnitudes related to said one of said first and second control signals and said input data signal; and measuring each one of said plurality of sequential output data signal magnitudes, followed by
  providing said first control signal corresponding to said first control parameter and having a second one of said first plurality of values,
  providing said second control signal corresponding to said second control parameter and having a second sequential subset of said second plurality of values, and
  repeating said providing of said power supply voltage, said bias current, said input data signal and said output data signal, and said measuring of each one of said plurality of sequential output data signal magnitudes.

2. The method of claim 1, wherein said providing a first control signal comprises providing an amplifier bias current control signal.

3. The method of claim 1, wherein said providing a second control signal comprises providing a signal gain control signal.

4. The method of claim 1, wherein:
said providing a first control signal comprises providing an amplifier bias current control signal; and
said providing a second control signal comprises providing a signal gain control signal.

5. The method of claim 1, wherein said first and second sequential subsets of said second plurality of values have first and second mean values, respectively.

6. The method of claim 1, wherein:
said first sequential subset of said second plurality of values has first minimum and maximum values;
said second sequential subset of said second plurality of values has second minimum and maximum values; and
one of said first minimum and maximum values is between said second minimum and maximum values.

7. The method of claim 1, wherein:
said first sequential subset of said second plurality of values has first minimum and maximum values;
said second sequential subset of said second plurality of values has second minimum and maximum values; and
neither of said first minimum and maximum values is between said second minimum and maximum values.

8. An apparatus including a system for testing a data signal amplifier having an output signal power dependent upon a plurality of signal power control parameters, comprising:
controller means for controlling
  as part of a first test sequence, conveyance of
    a first control signal corresponding to a first control parameter and having a first one of a first plurality of values,
    a second control signal corresponding to a second control parameter and having a first sequential subset of a second plurality of values,
    a power supply voltage and a bias current to an amplifier with at least one of which having a magnitude related to one of said first and second control signals, and
    an input data signal to said amplifier having a plurality of sequential magnitudes related to another of said first and second control signals, and
  as part of a second test sequence, conveyance of
    said first control signal corresponding to said first control parameter and having a second one of said first plurality of values,
    said second control signal corresponding to said second control parameter and having a second sequential subset of said second plurality of values,
    said power supply voltage and said bias current to said amplifier with said at least one of which having a magnitude related to said one of said first and second control signals, and
    said input data signal to said amplifier having a plurality of sequential magnitudes related said another of said first and second control signals; and
receiver means for
  as part of said first test sequence,
    receiving an output data signal from said amplifier and having a plurality of sequential magnitudes related to said one of said first and second control signals and said input data signal, and
    measuring each one of said plurality of sequential output data signal magnitudes, and
  as part of said second test sequence,
    receiving said output data signal from said amplifier and having a plurality of sequential magnitudes related to said first control signal and said input data signal, and
    measuring each one of said plurality of sequential output data signal magnitudes.

9. The apparatus of claim 8, wherein said controller means is for controlling, as part of said first and second test sequences, conveyance of an amplifier bias current control signal as said first control signal.

10. The apparatus of claim 8, wherein said controller means is for controlling, as part of said first and second test sequences, conveyance of a signal gain control signal as said second control signal.

11. The apparatus of claim 8, wherein said controller means is for controlling, as part of said first and second test sequences, conveyance of:
an amplifier bias current control signal as said first control signal; and
a signal gain control signal as said second control signal.

12. The apparatus of claim 8, wherein said first and second sequential subsets of said second plurality of values have first and second mean values, respectively.

13. The apparatus of claim 8, wherein:
said first sequential subset of said second plurality of values has first minimum and maximum values;
said second sequential subset of said second plurality of values has second minimum and maximum values; and
one of said first minimum and maximum values is between said second minimum and maximum values.

14. The apparatus of claim 8, wherein:
said first sequential subset of said second plurality of values has first minimum and maximum values;
said second sequential subset of said second plurality of values has second minimum and maximum values; and
neither of said first minimum and maximum values is between said second minimum and maximum values.

* * * * *